(12) United States Patent
Ishizaki et al.

(10) Patent No.: US 12,623,750 B2
(45) Date of Patent: May 12, 2026

(54) DRIVE UNIT FOR HUMAN-POWERED VEHICLE

(71) Applicant: Shimano Inc., Sakai (JP)

(72) Inventors: Hiroyuki Ishizaki, Sakai (JP); Hikaru Naruse, Sakai (JP); Tsuyoshi Kameda, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 19/236,199

(22) Filed: Jun. 12, 2025

(65) Prior Publication Data

US 2026/0054799 A1 Feb. 26, 2026

(30) Foreign Application Priority Data

Aug. 26, 2024 (JP) ................................. 2024-144215

(51) Int. Cl.
*B62M 6/50* (2010.01)
*B62J 45/413* (2020.01)
*B62M 6/55* (2010.01)

(52) U.S. Cl.
CPC .............. *B62M 6/50* (2013.01); *B62J 45/413* (2020.02); *B62M 6/55* (2013.01)

(58) Field of Classification Search
CPC ......... B62J 45/41; B62M 11/145; B62M 6/40
See application file for complete search history.

(56) References Cited

U.S. PATENT DOCUMENTS

| | | | | |
|---|---|---|---|---|
| 9,834,278 B2 * | 12/2017 | Uda | ......................... | F16D 41/24 |
| 10,876,602 B2 * | 12/2020 | Mei | ......................... | H02K 11/24 |
| 11,104,401 B2 * | 8/2021 | Noda | ......................... | F16H 1/20 |
| 11,203,396 B2 * | 12/2021 | Yamamoto | ........... | B62M 11/145 |
| 2016/0332696 A1 * | 11/2016 | Spaggiari | ............... | H02K 7/116 |

FOREIGN PATENT DOCUMENTS

JP 2014-196036 A 10/2014

* cited by examiner

*Primary Examiner* — Derek D Knight
(74) *Attorney, Agent, or Firm* — Spencer Fane, LLP

(57) ABSTRACT

A drive unit is configured to be provided to a human-powered vehicle. The drive unit basically includes a support, a drive shaft, an output portion, a motor, a transmission mechanism, and a motor output shaft. The drive shaft is configured to receive a human driving force, and includes a first axis. The output portion is provided on the drive shaft. The motor includes a rotor and a stator. The transmission mechanism is configured to transmit a motor torque of the motor to the output portion. The motor output shaft is connected to the rotor, and includes a second axis. The transmission mechanism includes a first transmission unit including a planetary gear mechanism. At least part of the planetary gear mechanism is configured to rotate about the second axis and overlaps the motor as viewed in a first direction that is orthogonal to the second axis.

21 Claims, 8 Drawing Sheets

DRIVE UNIT FOR HUMAN-POWERED VEHICLE

CROSS-REFERENCE TO RELATED APPLICATIONS

This application claims priority to Japanese Patent Application No. 2024-144215, filed on Aug. 26, 2024. The entire disclosure of Japanese Patent Application No. 2024-144215 is hereby incorporated herein by reference.

BACKGROUND

Technical Field

The present disclosure generally relates to a drive unit for a human-powered vehicle.

Background Information

Japanese Laid-Open Patent Publication No. 2014-196036 (hereinafter referred to as Patent Document 1) discloses an example of a human-powered vehicle drive unit including a motor that applies propulsion force to the human-powered vehicle. In Patent Document 1, torque of the motor is transmitted to a crank axle of the human-powered vehicle.

SUMMARY

An objective of the present disclosure is to provide a drive unit for a human-powered vehicle that applies propulsion force to the human-powered vehicle in a preferred manner.

A drive unit in accordance with a first aspect of the present disclosure is configured for a human-powered vehicle. The drive unit comprises a support, a drive shaft, an output portion, a motor, a transmission mechanism, and a motor output shaft. The drive shaft is configured to receive a human driving force, and has a first axis. The output portion is provided on the drive shaft. The motor includes a rotor and a stator. The transmission mechanism is configured to transmit a motor torque of the motor to the output portion. The motor output shaft is connected to the rotor, and has a second axis differing from the first axis. The transmission mechanism includes a first transmission unit that includes a planetary gear mechanism. At least part of the planetary gear mechanism is configured to rotate about the second axis and overlaps the motor as viewed in a first direction that is orthogonal to the second axis.

With the drive unit according to the first aspect, the transmission mechanism transmits motor torque through the first transmission unit, which includes the planetary gear mechanism, to the drive shaft in a preferred manner. Accordingly, the drive unit applies propulsion force to the human-powered vehicle in a preferred manner. With the drive unit according to the first aspect, at least part of the planetary gear mechanism is configured to rotate about the second axis and overlaps the motor as viewed in the first direction that is orthogonal to the second axis. This reduces the drive unit in size in a direction parallel to the first axis.

In accordance with a second aspect of the present disclosure, the drive unit according to the first aspect is configured so that the at least part of the planetary gear mechanism overlaps the rotor as viewed in the first direction.

With the drive unit according to the second aspect, at least part of the planetary gear mechanism overlaps the rotor as viewed in the first direction. This reduces the drive unit in size in a direction parallel to the first axis.

In accordance with a third aspect of the present disclosure, the drive unit according to the second aspect is configured so that the stator is arranged at a radially outer side of the rotor. The at least part of the planetary gear mechanism is arranged at a radially inner side of the rotor.

With the drive unit according to the third aspect, at least part of the planetary gear mechanism is arranged at the radially inner side of the rotor. This reduces the drive unit in size in a direction parallel to the first axis.

In accordance with a fourth aspect of the present disclosure, the drive unit according to the second aspect is configured so the rotor is arranged at a radially outer side of the stator. The at least part of the planetary gear mechanism is arranged at a radially inner side of the stator.

With the drive unit according to the fourth aspect, at least part of the planetary gear mechanism is arranged at the radially inner side of the stator. This reduces the drive unit in size in a direction parallel to the first axis.

In accordance with a fifth aspect of the present disclosure, the drive unit according to any one of the first to fourth aspects is configured so that the at least part of the planetary gear mechanism overlaps the rotor at a radially outer side of the motor as viewed in the first direction.

With the drive unit according to the fifth aspect, at least part of the planetary gear mechanism overlaps the rotor at the radially outer side of the motor as viewed in the first direction. This reduces the drive unit in size in a direction parallel to the first axis.

In accordance with a sixth aspect of the present disclosure, the drive unit according to any one of the first to fifth aspects is configured so that the transmission mechanism further includes a transmission shaft having a third axis that differs from the first axis and the second axis.

With the drive unit according to the sixth aspect, at least part of the transmission mechanism is provided on the transmission shaft that differs from the drive shaft and the motor output shaft.

In accordance with a seventh aspect of the present disclosure, the drive unit according to the sixth aspect is configured so that the transmission mechanism further includes a second transmission unit including a first transmission gear and a second transmission gear. The first transmission gear receives torque from the planetary gear mechanism. The second transmission gear is engaged with the first transmission gear and is provided on the transmission shaft.

With the drive unit according to the seventh aspect, the second transmission unit transmits the torque, received from the planetary gear mechanism, in a preferred manner.

In accordance with an eighth aspect of the present disclosure, the drive unit according to the seventh aspect is configured so that the first transmission gear has a first pitch diameter, the second transmission gear has a second pitch diameter, and the second pitch diameter is greater than the first pitch diameter.

With the drive unit according to the eighth aspect, the second transmission unit is a speed reducer. Therefore, the second transmission unit transmits motor torque in a preferred manner.

In accordance with a ninth aspect of the present disclosure, the drive unit according to the seventh or eighth aspect is configured so that the transmission mechanism further includes a third transmission unit including a third transmission gear and a fourth transmission gear. The third transmission gear is provided on the transmission shaft. The fourth transmission gear is engaged with the third transmission gear and is provided on the output portion.

With the drive unit according to the ninth aspect, the third transmission unit transmits the torque, transferred from the planetary gear mechanism, in a preferred manner.

In accordance with a tenth aspect of the present disclosure, the drive unit according to the ninth aspect is configured so that the third transmission gear has a third pitch diameter, the fourth transmission gear has a fourth pitch diameter, and the fourth pitch diameter is greater than the third pitch diameter.

With the drive unit according to the tenth aspect, the third transmission unit is a speed reducer. Therefore, the third transmission unit transmits motor torque in a preferred manner.

In accordance with an eleventh aspect of the present disclosure, the drive unit according to any one of the sixth to tenth aspects is configured so that the second axis and the third axis are parallel to the first axis.

With the drive unit according to the eleventh aspect, the motor output shaft is arranged parallel to the drive shaft. With the drive unit according to the eleventh aspect, the transmission shaft is arranged parallel to the drive shaft.

In accordance with a twelfth aspect of the present disclosure, the drive unit according to the first aspect is configured so that the planetary gear mechanism includes a sun gear, a ring gear, a planet gear, and a carrier. The sun gear is configured to receive a rotational torque from the motor output shaft. The ring gear is non-rotatably provided on the support. The planet gear is configured to receive a rotational torque from the sun gear and is provided between the sun gear and the ring gear. The carrier supports the planet gear and is configured to output a rotational torque to the output portion.

With the drive unit according to the twelfth aspect, the planetary gear mechanism is a speed reducer. Therefore, the planetary gear mechanism transmits motor torque in a preferred manner.

In accordance with a thirteenth aspect of the present disclosure, the drive unit according to the first aspect is configured so that the planetary gear mechanism entirely overlaps the motor as viewed in the first direction.

With the drive unit according to the thirteenth aspect, the planetary gear mechanism entirely overlaps the motor as viewed in the first direction. This reduces the drive unit in size in a direction parallel to the first axis.

In accordance with a fourteenth aspect of the present disclosure, the drive unit according to the first aspect is configured so that the planetary gear mechanism includes a sun gear, a ring gear, a planet gear, and a carrier. The planet gear is provided between the sun gear and the ring gear. The carrier supports the planet gear. At least one of the sun gear, the planet gear, and the ring gear at least partially overlaps the motor as viewed in the first direction.

With the drive unit according to the fourteenth aspect, at least one of the sun gear, the planet gear, and the ring gear at least partially overlaps the motor as viewed in the first direction. This reduces the drive unit in size in a direction parallel to the first axis.

In accordance with a fifteenth aspect of the present disclosure, the drive unit according to the fourteenth aspect is configured so that at least part of the ring gear overlaps the motor as viewed in the first direction.

With the drive unit according to the fifteenth aspect, at least part of the ring gear overlaps the motor as viewed in the first direction. This reduces the drive unit in size in a direction parallel to the first axis.

In accordance with a sixteenth aspect of the present disclosure, the drive unit according to the first aspect further comprises a first bearing rotatably supporting the motor output shaft. At least part of the first bearing overlaps the rotor as viewed in the first direction.

With the drive unit according to the sixteenth aspect, at least part of the first bearing overlaps the rotor as viewed in the first direction. This reduces the drive unit in size in a direction parallel to the first axis.

In accordance with a seventeenth aspect of the present disclosure, the drive unit according to any one of the first to sixteenth aspects is configured so that the motor has a first maximum outer diameter, the output portion has a second maximum outer diameter, and the first maximum diameter is greater than the second maximum diameter.

With the drive unit according to the seventeenth aspect, the planetary gear mechanism is arranged so that at least part of the planetary gear mechanism overlaps the motor, which has the first maximum outer diameter that is greater than the second maximum outer diameter of the output portion.

In accordance with an eighteenth aspect of the present disclosure, the drive unit according to any one of the first to seventeenth aspects further comprises a circuit board. The circuit board is arranged at a position separated from the motor output shaft in a second direction that is parallel to the second axis.

With the drive unit according to the eighteenth aspect, the circuit board is arranged at a position that is not likely to interfere with the motor output shaft.

In accordance with a nineteenth aspect of the present disclosure, the drive unit according to the eighteenth aspect further comprises a motor rotational state detector configured to detect a rotational state of the motor output shaft. The circuit board includes a predetermined part facing the motor output shaft in the second direction. The motor rotational state detector is provided on the predetermined part.

With the drive unit according to the nineteenth aspect, the motor rotational state detector is provided on the predetermined part of the circuit board that faces the motor output shaft. Therefore, the motor rotational state detector detects the rotational state of the motor in a preferred manner.

In accordance with a twentieth aspect of the present disclosure, the drive unit according to any one of the first to nineteenth aspects further comprises a human driving force detector that is configured to detect a human driving force applied to the human-powered vehicle.

With the drive unit according to the twentieth aspect, the human driving force detector detects a human driving force.

A drive unit in accordance with a twenty-first aspect of the present disclosure is for a human-powered vehicle. The drive unit comprises a support, a drive shaft, an output portion, a motor, a transmission mechanism, and a motor output shaft. The drive shaft is configured to receive a human driving force, and has a first axis. The output portion is provided on the drive shaft. The motor includes a rotor and a stator. The transmission mechanism is configured to transmit a motor torque of the motor to the output portion. The motor output shaft is connected to the rotor, and has a second axis differing from the first axis. The transmission mechanism includes a first transmission unit that includes a speed reduction mechanism. At least part of the speed reduction mechanism is configured to rotate about the second axis and overlaps the motor as viewed in a first direction that is orthogonal to the second axis.

With the drive unit according to the twenty-first aspect, the transmission mechanism transmits motor torque through the first transmission unit, which includes the speed reduction mechanism, to the drive shaft in a preferred manner. Accordingly, the drive unit applies propulsion force to the human-powered vehicle in a preferred manner. With the drive unit according to the twenty-first aspect, at least part of the speed reduction mechanism is configured to rotate about the second axis and overlaps the motor as viewed in the first direction that is orthogonal to the second axis. This reduces the drive unit in size in a direction parallel to the first axis.

The drive unit for a human-powered vehicle in accordance with the present disclosure applies propulsion force to the human-powered vehicle in a preferred manner.

BRIEF DESCRIPTION OF THE DRAWINGS

Referring now to the attached drawings which form a part of this original disclosure, illustrative embodiments are shown.

DETAILED DESCRIPTION OF THE EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
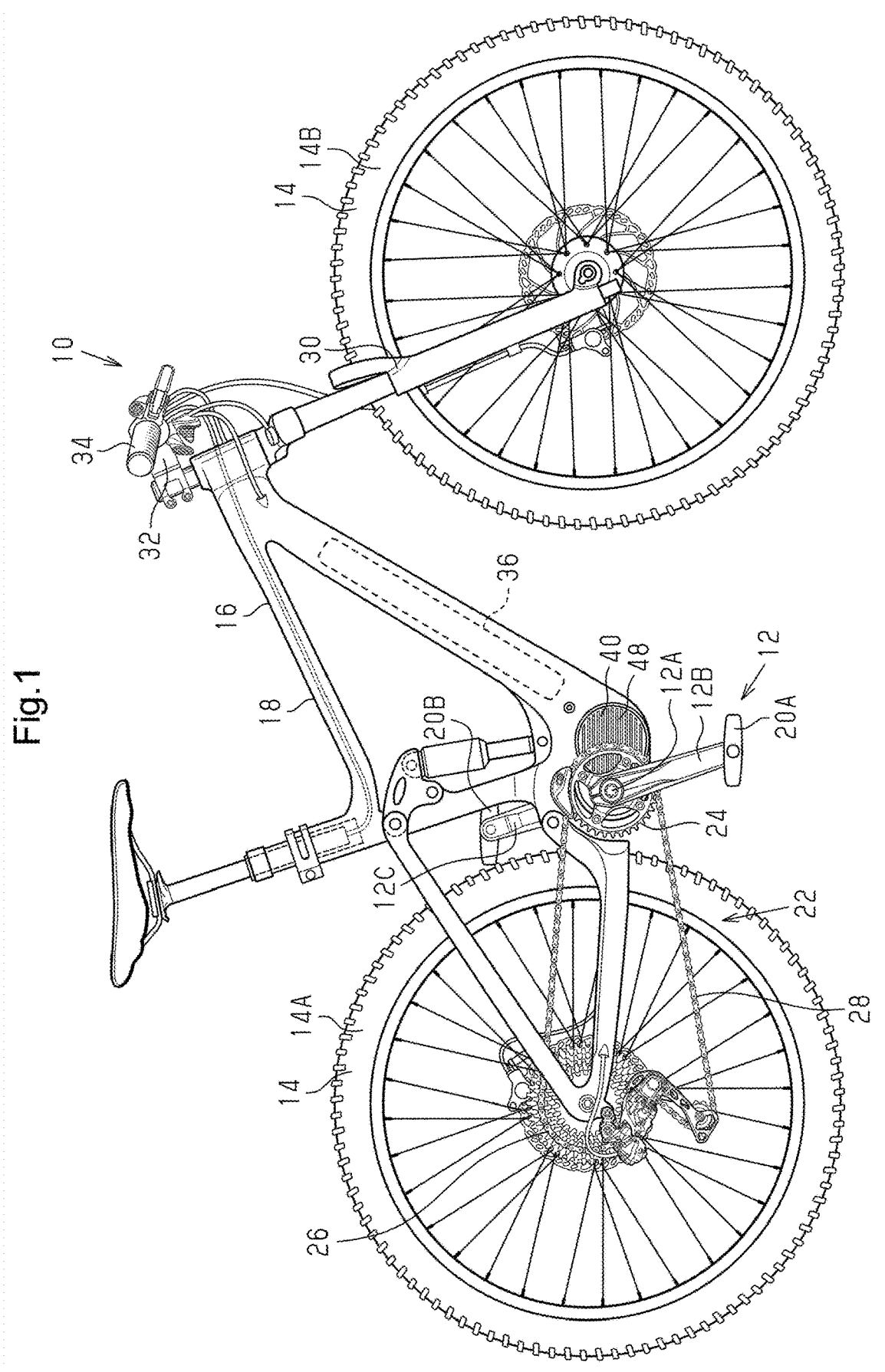
FIG. 1 is a side elevational view of a human-powered vehicle including a human-powered vehicle drive unit in accordance with an embodiment.

A drive unit 40 for a human-powered vehicle 10 will now be described with reference to FIGS. 1 to 8. The human-powered vehicle 10 is a vehicle that includes at least one wheel and can be driven by at least a human driving force. As seen in FIG. 1, the human-powered vehicle 10 is a bicycle. It will be apparent from this disclosure that the drive unit 40 can be provided to other types of human-powered vehicles. For example, the drive unit 40 can be provided to human-powered vehicles such as various types of bicycles such as a mountain bike, a road bike, a city bike, a cargo bike, a handcycle, or a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a driving force of an electric motor for propulsion in addition to a human driving force. The E-bike includes an electric assist bicycle that assists in propulsion with an electric motor. In the description hereafter, the human-powered vehicle 10 refers to an electric assist bicycle.

As shown in FIG. 1, the human-powered vehicle 10 includes, for example, a crank 12 to which a human driving force is input. The human-powered vehicle 10 includes, for example, a wheel 14 and a vehicle body 16. The wheel 14 includes, for example, a drive wheel 14A and a driven wheel 14B. The drive wheel 14A is, for example, a rear wheel of the human-powered vehicle 10. The driven wheel 14B is, for example, a front wheel of the human-powered vehicle 10. The drive wheel 14A can be the front wheel of the human-powered vehicle 10. In a case where the drive wheel 14A is the front wheel, the driven wheel 14B is the rear wheel.

The vehicle body 16 includes, for example, a frame 18. The crank 12 includes, for example, a crank axle 12A and two crank arms 12B and 12C. The crank axle 12A is rotatable relative to the frame 18. The two crank arms 12B and 12C are provided on two axial ends of the crank axle 12A, respectively. A pedal 20A is connected to the crank arm 12B. A pedal 20B is connected to the crank arm 12C. The drive wheel 14A is, for example, driven by rotation of the crank 12. The drive wheel 14A is, for example, supported by the frame 18.

The crank 12 is, for example, linked to the drive wheel 14A by a drive mechanism 22. The drive mechanism 22 includes, for example, a first rotational body 24 coupled to the crank axle 12A. The crank axle 12A is, for example, coupled to the first rotational body 24 by a first one-way clutch 38 shown in FIG. 6. The crank axle 12A can be coupled to the first rotational body 24 in an integrally rotatable manner. The first rotational body 24 includes, for example, a sprocket, a pulley, or a bevel gear.

The drive mechanism 22 further includes, for example, a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is, for example, coupled to the drive wheel 14A. The second rotational body 26 includes, for example, a sprocket, a pulley, or a bevel gear. For example, a second one-way clutch is provided in a power transmission path of the human driving force between the second rotational body 26 and the drive wheel 14A. The second one-way clutch is, for example, configured to rotate the drive wheel 14A forward in a case where the second rotational body 26 is rotated forward. The second one-way clutch is, for example, configured to permit relative rotation of the second rotational body 26 and the drive wheel 14A in a case where the second rotational body 26 is rotated rearward.

The front wheel is, for example, attached to the frame 18 by a front fork 30. A handlebar 34 is connected to the front fork 30 by a stem 32. In the present embodiment, the rear wheel is connected to the crank 12 by the drive mechanism 22. In the present embodiment, the rear wheel is the drive wheel 14A, and the front wheel is the driven wheel 14B.

The human-powered vehicle 10 further includes, for example, a battery 36. The battery 36 includes, for example, one or more battery cells. Each battery cell includes, for example, a rechargeable battery. The battery 36 is, for example, configured to supply electric power to the drive unit 40. The battery 36 is, for example, connected to the drive unit 40 in a manner allowing for wired communication or wireless communication. In a case where the battery 36 is connected to the drive unit 40 in a manner allowing for wired communication, for example, the battery 36 is configured to communicate with the drive unit 40 through a conductive body, such as circuit board wiring, an electric wire, or the like. In a case where the battery 36 is connected to the drive unit 40 in a manner allowing for wired communication, the battery 36 can be configured to communicate with the drive unit 40 through an optical fiber cable. The battery 36 is configured to establish communication with the drive unit 40 through, for example, power line communication (PLC), Controller Area Network (CAN), or universal asynchronous receiver-transmitter (UART).

As shown in FIGS. 2 to 8, the drive unit 40 includes, for example, a support 42, a drive shaft 44, an output portion 46, a motor 48, a transmission mechanism 50, and a motor output shaft 52.

Figure 6:
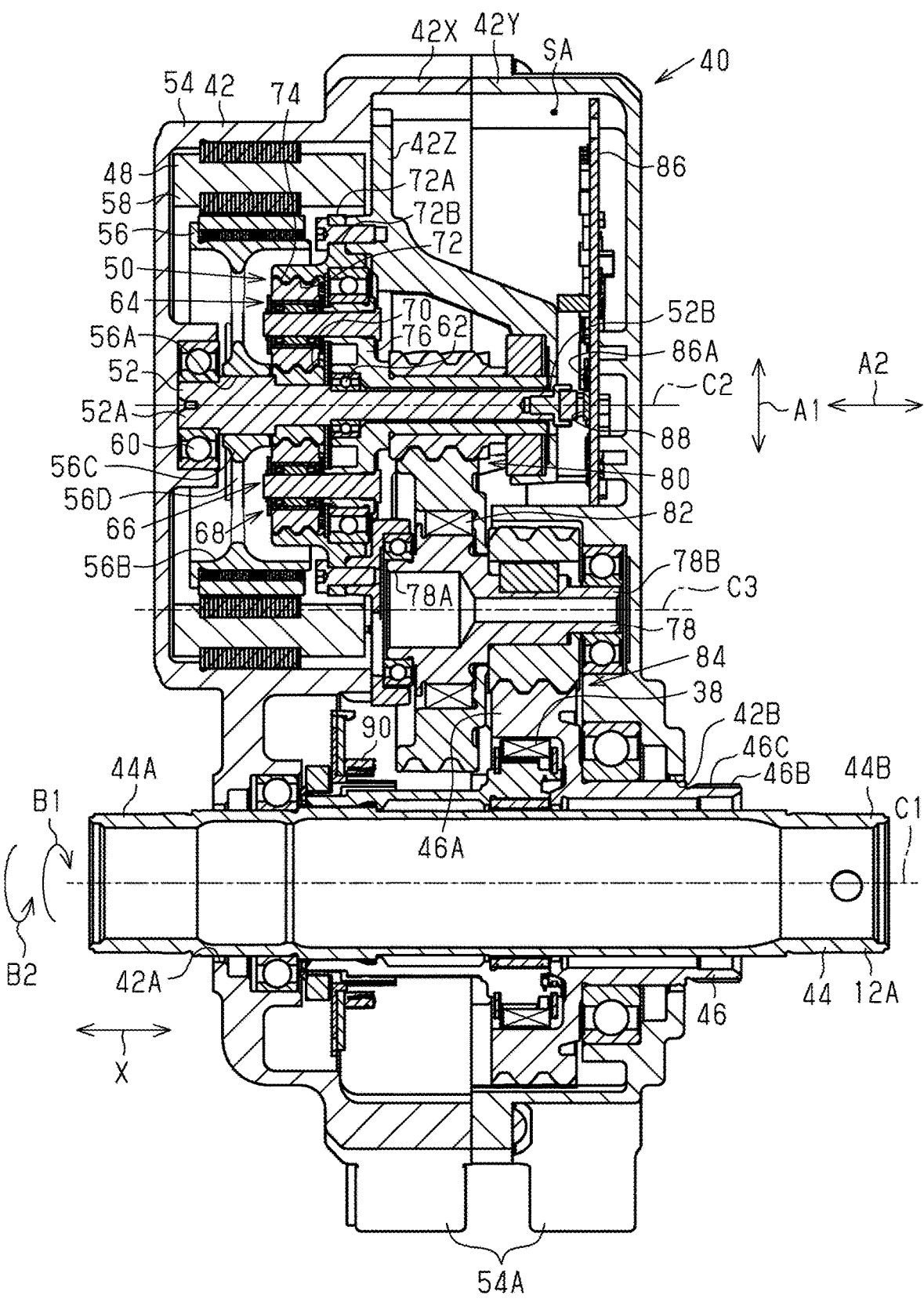
FIG. 6 is a cross-sectional view of the human-powered vehicle drive unit taken along section line D6-D6 shown in FIG. 4.

As shown in FIG. 6, the drive unit 40 includes, for example, a housing 54. The housing 54 forms, for example, an accommodation cavity SA. The housing 54 at least partially accommodates, for example, at least one of the drive shaft 44, the output portion 46, the motor 48, the transmission mechanism 50, and the motor output shaft 52 in the accommodation cavity SA. The housing 54 includes, for example, a metal material. The metal material includes, for example, at least one of an aluminum alloy and a magnesium alloy. Instead of or in addition to the metal material, the housing 54 can include a synthetic resin.

The support 42 is, for example, formed integrally with at least part of the housing 54. The support 42 at least partially supports, for example, at least one of the drive shaft 44, the motor 48, the transmission mechanism 50, and the motor output shaft 52.

The drive unit 40 is, for example, attached to the frame 18 in a detachable manner. The housing 54 includes at least one coupling portion 54A. The at least one coupling portion 54A is provided on an outer peripheral portion of the housing 54. The at least one coupling portion 54A includes at least one of a hole and an internal threaded portion. The hole and the internal threaded portion extend, for example, in a direction parallel to the drive shaft 44. The housing 54 includes, for example, three coupling portions 54A. For example, the drive unit 40 is attached to the frame 18 by fastening a fastener, such as a bolt, to at least one of the at least one coupling portion 54A and a portion of the frame 18 that corresponds to the at least one coupling portion 54A.

The support 42 includes, for example, a first support 42X and a second support 42Y. The first support 42X includes, for example, a wall of the housing 54 located at one side with respect to an axial direction X of the drive shaft 44. The second support 42Y includes, for example, a wall of the housing 54 located at the other side with respect to the axial direction X of the drive shaft 44. The second support 42Y is, for example, joined to the first support 42X by a fastener, such as a bolt. For example, the first support 42X and the second support 42Y are joined to each other to form the accommodation cavity SA between the first support 42X and the second support 42Y. The support 42 includes, for example, a third support 42Z. The third support 42Z is, for example, arranged in the accommodation cavity SA. The third support 42Z supports, for example, at least part of the motor output shaft 52 and at least part of the transmission mechanism 50.

In an example, the drive shaft 44 receives a human driving force and has a first axis C1. The drive shaft 44 is, for example, the crank axle 12A. As long as the drive shaft 44 is a shaft that receives a human driving force, the drive shaft 44 can differ from the crank axle 12A. In a case where the drive shaft 44 differs from the crank axle 12A, the drive shaft 44 can be a shaft separate from the crank axle 12A and connected to the crank axle 12A. The drive shaft 44 is, for example, formed from metal. The drive shaft 44 is, for example, a hollow shaft. The drive shaft 44 can be a solid shaft. The drive shaft 44 is, for example, supported by the support 42 in a manner rotatable relative to the support 42. For example, a bearing that rotatably supports the drive shaft 44 is provided between the drive shaft 44 and the support 42 in a radial direction of the drive shaft 44.

Figure 7:
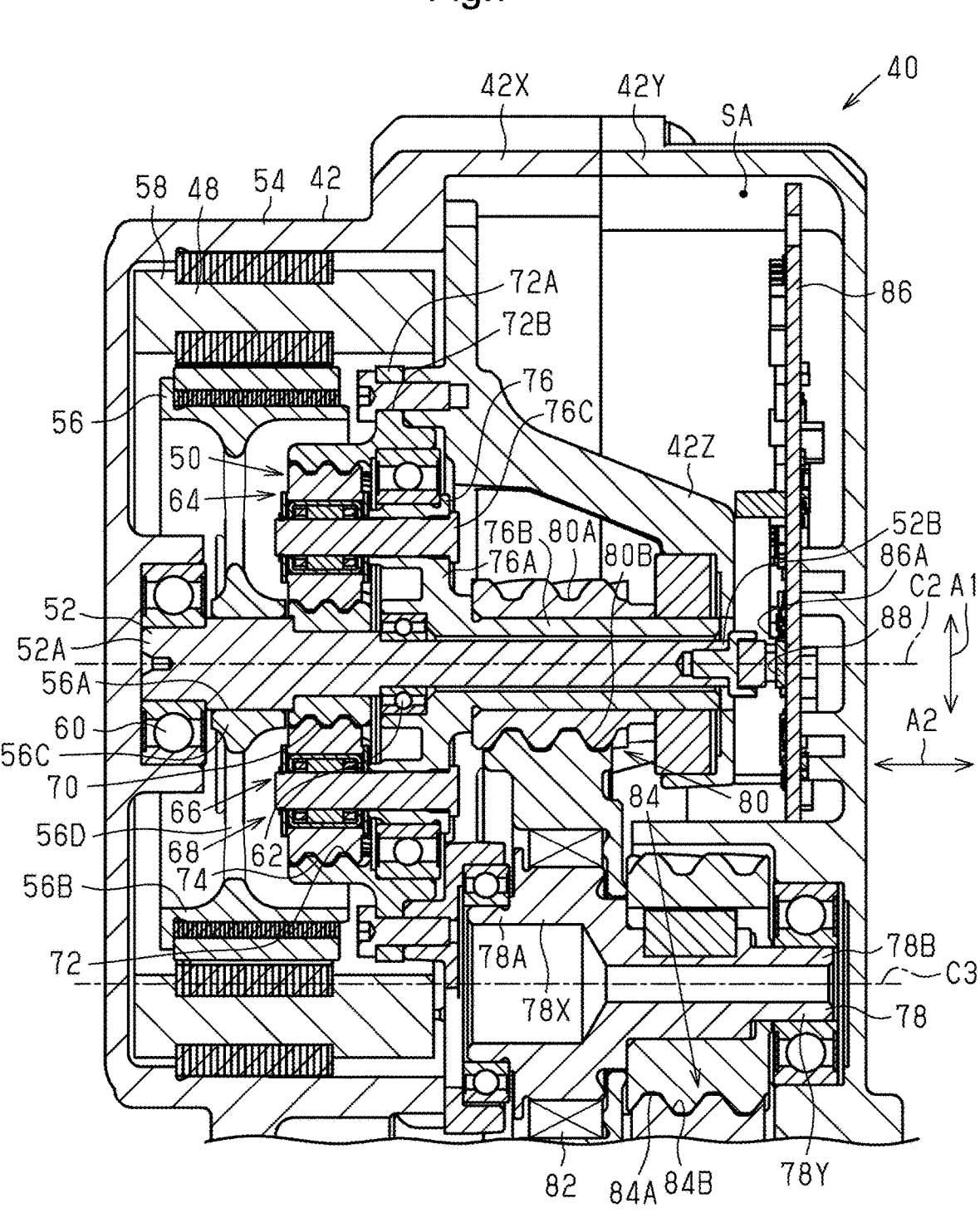
FIG. 7 is an enlarged cross-sectional view of a portion of the human-powered vehicle drive unit shown in FIG. 6.
Figure 8:
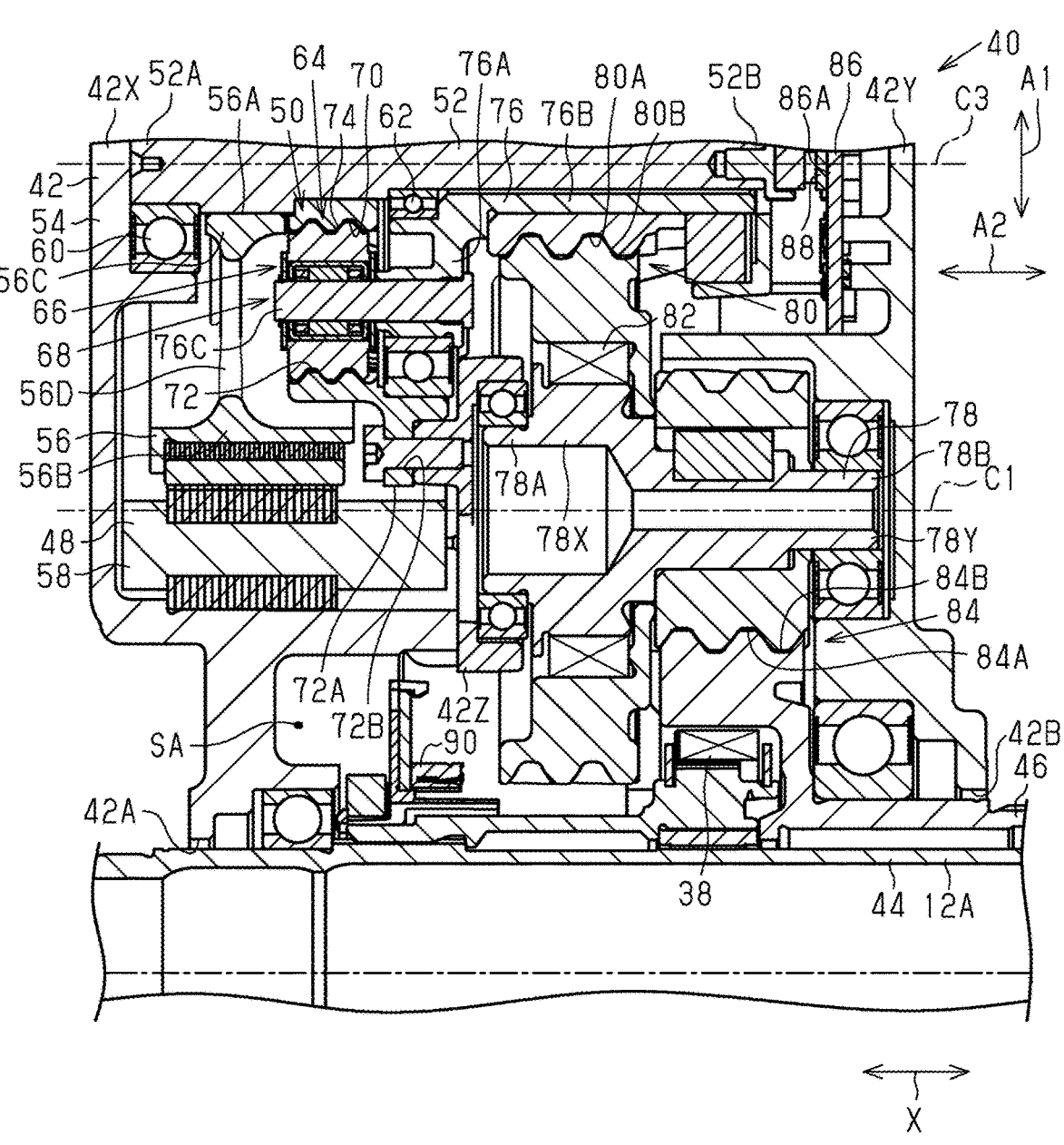
FIG. 8 is an enlarged cross-sectional view of a portion of the human-powered vehicle drive unit shown in FIG. 6.

As shown in FIGS. 6 to 8, the support 42 includes a first hole 42A and a second hole 42B. The first hole 42A is, for example, provided in the first support 42X. The second hole 42B is, for example, provided in the second support 42Y. The drive shaft 44 includes, for example, a first drive shaft end 44A and a second drive shaft end 44B opposite to the first drive shaft end 44A in the axial direction X of the drive shaft 44. The drive shaft 44 extends through, for example, the first hole 42A and the second hole 42B. For example, the first drive shaft end 44A and the second drive shaft end 44B are exposed to the outside from the support 42. The first drive shaft end 44A is, for example, exposed to the outside from the support 42 through the first hole 42A. The second drive shaft end 44B is, for example, exposed to the outside from the support 42 through the second hole 42B.

The output portion 46 is, for example, provided on the drive shaft 44. The output portion 46 is, for example, a hollow shaft. At least part of the drive shaft 44 is, for example, inserted to the output portion 46. The output portion 46 includes, for example, a metal material. The output portion 46 includes a first output portion end 46A and a second output portion end 46B opposite to the first output portion end 46A in the axial direction X of the drive shaft 44. The output portion 46 includes, for example, a connecting portion 46C. The connecting portion 46C is, for example, provided on the second output portion end 46B of the output portion 46. The connecting portion 46C is, for example, provided on an outer circumferential surface of the second output portion end 46B of the output portion 46. The connecting portion 46C includes, for example, splines. For example, the first rotational body 24 is attached to the connecting portion 46C.

At least part of the output portion 46 is, for example, located in the second hole 42B. The output portion 46 is, for example, supported by the second support 42Y in a manner rotatable relative to the second support 42Y. For example, a bearing that supports the output portion 46 in a manner rotatable relative to the second support 42Y is provided between the output portion 46 and the second support 42Y in a radial direction of the output portion 46. The output portion 46 extends around the drive shaft 44. The output portion 46 is, for example, coupled to the drive shaft 44 by the first one-way clutch 38. The first one-way clutch 38 is, for example, configured to rotate the output portion 46 in a case where the drive shaft 44 is rotated in a first rotational direction B1. The first one-way clutch 38 is, for example, configured to permit relative rotation of the drive shaft 44 and the output portion 46 in a case where the drive shaft 44 is rotated in a second rotational direction B2 that is opposite to the first rotational direction B1.

The motor 48 is, for example, configured to apply a propulsion force to the human-powered vehicle 10. The motor 48 is configured to transmit a rotational force through the motor output shaft 52 to at least one of the driven wheel 14B and a transmission path of the human driving force extending from the pedals 20A and 20B to the drive wheel 14A. The power transmission path of the human driving force extending from the pedals 20A and 20B to the drive wheel 14A includes the drive wheel 14A. The motor 48 is, for example, provided on the frame 18 of the human-powered vehicle 10. The motor 48 is, for example, configured to transmit a rotational force through the motor output shaft 52 to the output portion 46.

The motor 48 includes, for example, an electric motor. The motor 48 is, for example, a radial gap type motor. The motor 48 is, for example, an inner rotor type motor. The motor 48 is, for example, a brushless motor. The motor 48 can be an axial gap type motor.

The motor 48 includes, for example, a rotor 56 and a stator 58. The stator 58 is, for example, arranged at a radially outer side of the rotor 56. The stator 58 is, for example, attached to the housing 54. The stator 58 is, for example, ring-shaped. A part of the housing 54 that accommodates the stator 58 is, for example, formed integrally with the remaining part of the housing 54. The part of the housing 54 that accommodates the stator 58 can be formed separately from the remaining part of the housing 54.

The rotor 56 is, for example, configured to be rotatable relative to the stator 58. The rotor 56 includes, for example, a magnet. The rotor 56 is, for example, hollow. The rotor 56 includes, for example, a through hole 56A through which the motor output shaft 52 extends. The rotor 56 includes, for example, an outer circumferential portion 56B, an inner circumferential portion 56C, and an intermediate portion 56D.

The outer circumferential portion 56B is, for example, ring-shaped as viewed in a direction parallel to a rotational axis of the rotor 56. The outer circumferential portion 56B includes an outer circumferential surface that faces, for example, the stator 58. The magnet is, for example, attached to the outer circumferential portion 56B. The magnet can be magnetized on the outer circumferential portion 56B. The inner circumferential portion 56C is, for example, ring-shaped as viewed in a direction parallel to the rotational axis of the rotor 56. The through hole 56A is, for example, provided in the inner circumferential portion 56C. The intermediate portion 56D connects the outer circumferential portion 56B and the inner circumferential portion 56C. The intermediate portion 56D extends, for example, in a radial direction of the rotor 56. The intermediate portion 56D is, for example, rod-shaped or plate-shaped as viewed in a direction parallel to the rotational axis of the rotor 56. The rotor 56 includes, for example, a plurality of intermediate portions 56D. In the present embodiment, the rotor 56 includes five intermediate portions 56D. The intermediate portions 56D are, for example, provided at equal intervals in a circumferential direction of the rotor 56. The rotor 56 can include only one intermediate portion 56D.

The dimension of the intermediate portion 56D in a direction parallel to the rotational axis of the rotor 56 is, for example, less than or equal to the dimension of the inner circumferential portion 56C in the direction parallel to the rotational axis of the rotor 56. The dimension of the intermediate portion 56D in a direction parallel to the rotational axis of the rotor 56 is, for example, less than or equal to the dimension of the outer circumferential portion 56B in the direction parallel to the rotational axis of the rotor 56. The dimension of the inner circumferential portion 56C in a direction parallel to the rotational axis of the rotor 56 is, for example, less than the dimension of the outer circumferential portion 56B in the direction parallel to the rotational axis of the rotor 56. The intermediate portion 56D is, for example, located between two ends of the outer circumferential portion 56B in a direction parallel to the rotational axis of the rotor 56. The intermediate portion 56D is, for example, located between two ends of the inner circumferential portion 56C in a direction parallel to the rotational axis of the rotor 56.

Figure 2:
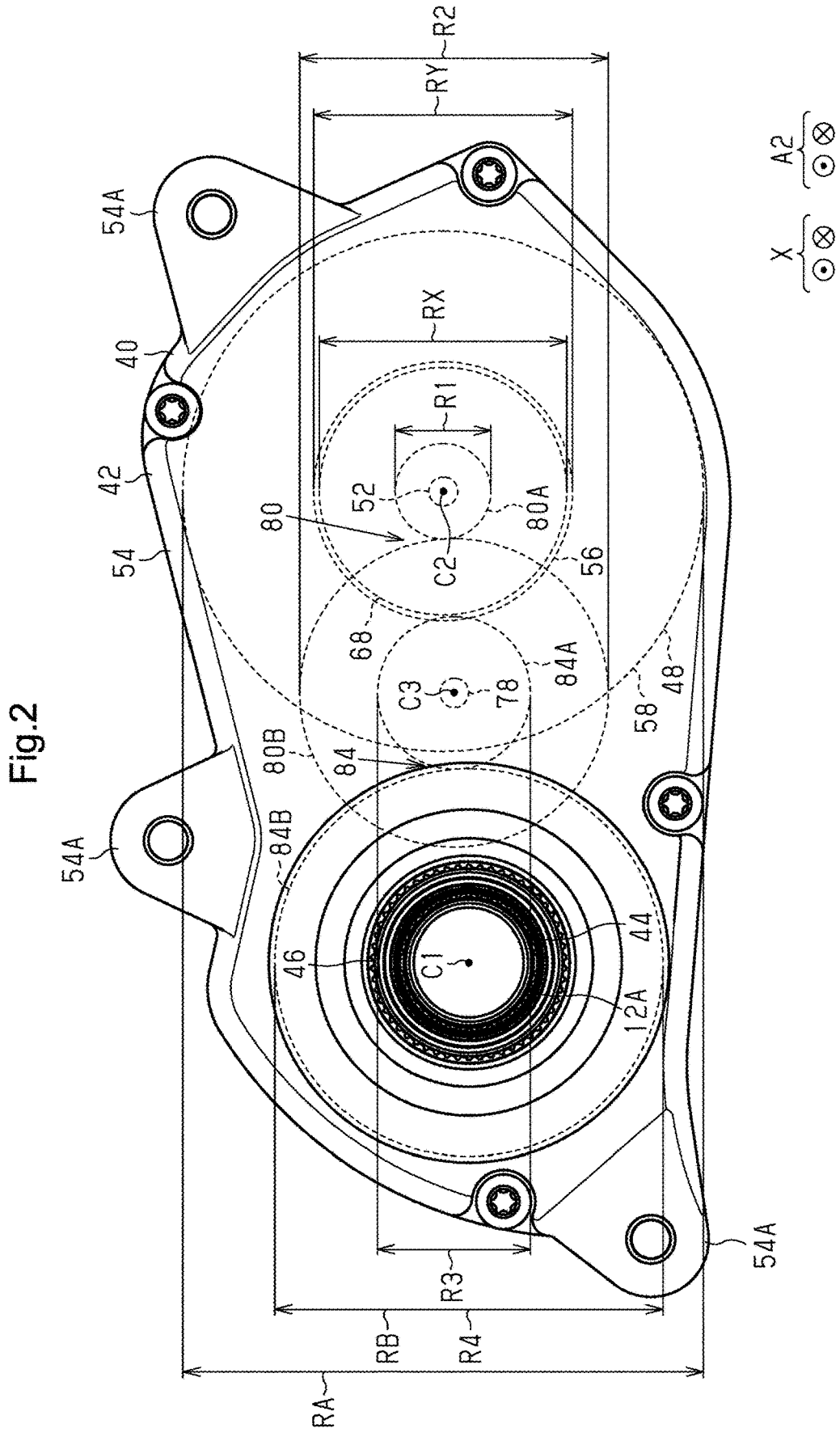
FIG. 2 is a side elevational view of the human-powered vehicle drive unit shown in FIG. 1.
Figure 3:
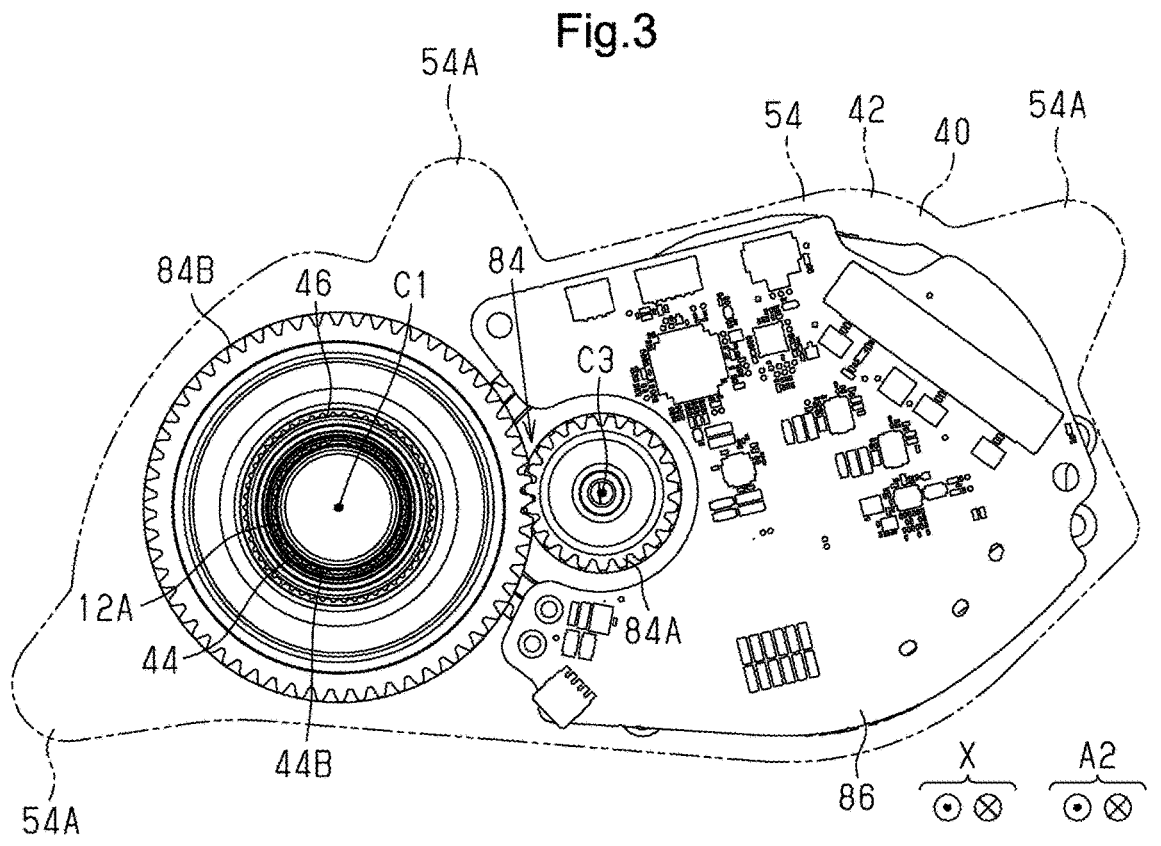
FIG. 3 is a side elevational view of the human-powered vehicle drive unit shown in FIG. 2 without a housing, as viewed from one side with respect to an axial direction of a drive shaft.

As shown in FIG. 2, for example, the motor 48 includes a first maximum outer diameter RA. For example, the first maximum outer diameter RA substantially coincides with the maximum outer diameter of the rotor 56. The output portion 46 include, for example, a second maximum outer diameter RB. The second maximum outer diameter RB substantially coincides with the maximum diameter of a fourth transmission gear 84B. The first maximum outer diameter RA is, for example, greater than the second maximum outer diameter RB.

As shown in FIGS. 6 to 8, for example, the motor output shaft 52 is connected to the rotor 56, and has a second axis C2 differing from the first axis C1. For example, the rotational axis of the rotor 56 coincides with the second axis C2. The rotational torque of the rotor 56 is, for example, transmitted through the motor output shaft 52 to the outside of the motor 48. In this specification, the motor 48 does not include the motor output shaft 52. In this specification, the motor output shaft 52 is not part of the motor 48. The motor output shaft 52 is, for example, coupled to the rotor 56 in a manner rotatable integrally with the rotor 56.

In the present embodiment, a direction orthogonal to the second axis C2 will be referred to as a first direction A1. In the present embodiment, a direction parallel to the second axis C2 will be referred to as a second direction A2. For example, the motor output shaft 52 extends in the second direction A2. The motor output shaft 52 includes, for example, a first motor output shaft end 52A and a second motor output shaft end 52B opposite to the first motor output shaft end 52A in the second direction A2. The first motor output shaft end 52A extends through, for example, the through hole 56A. The second motor output shaft end 52B is, for example, a free end.

The drive unit 40 further includes, for example, a first bearing 60 that rotatably supports the motor output shaft 52. For example, the first bearing 60 rotatably supports the first motor output shaft end 52A. The first bearing 60 includes, for example, a radial bearing. The first bearing 60 includes, for example, an inner race, an outer race, and rolling elements disposed between the inner race and the outer race.

The first bearing 60 is, for example, provided on the first support 42X. At least part of the first bearing 60 overlaps, for example, the rotor 56 as viewed in the first direction A1. At least part of the first bearing 60 is, for example, located in the hollow portion of the rotor 56. At least part of the first bearing 60 is located between an inner circumferential surface of the stator 58 and the motor output shaft 52. At least part of the first bearing 60 is located between an inner circumferential surface of the ring-shaped rotor 56 and the motor output shaft 52.

The drive unit 40 further includes, for example, a second bearing 62 that rotatably supports the motor output shaft 52. The second bearing 62 rotatably supports, for example, an intermediate part of the motor output shaft 52 between the first motor output shaft end 52A and the second motor output shaft end 52B. The second bearing 62 includes, for example, a radial bearing. The second bearing 62 includes, for example, an inner race, an outer race, and rolling elements disposed between the inner race and the outer race. The inner race of the second bearing 62 has a smaller inner diameter than the inner race of the first bearing 60. The outer race of the second bearing 62 has a smaller outer diameter than the outer race of the first bearing 60.

At least part of the second bearing 62 overlaps, for example, the stator 58 as viewed in the first direction A1. At least part of the second bearing 62 is, for example, located in the hollow portion of the rotor 56. At least part of the second bearing 62 is located between the inner circumferential surface of the ring-shaped stator 58 and the motor output shaft 52. The second bearing 62 is, for example, provided between a carrier 76 and the motor output shaft 52 in the first direction A1. The second bearing 62 is, for example, provided between a sun gear 70 and the carrier 76 in the second direction A2.

The transmission mechanism 50 is, for example, configured to transmit the motor torque of the motor 48 to the output portion 46. The transmission mechanism 50 is, for example, provided in a transmission path of the motor torque extending from the motor 48 to the output portion 46. The transmission mechanism 50 is, for example, configured to reduce the rotational speed of the motor 48 and transmit the motor torque to the output portion 46. The transmission mechanism 50 is, for example, configured to reduce the rotational speed of the motor 48 in two or more stages and transmit the motor torque to the output portion 46. In the present embodiment, the transmission mechanism 50 is configured to reduce the rotational speed of the motor 48 in three stages and transmit the motor torque to the output portion 46.

As shown in FIGS. 6 to 8, the transmission mechanism 50 includes, for example, a first transmission unit 64. The first transmission unit 64 includes, for example, a speed reduction mechanism 66. The speed reduction mechanism 66 is, for example, configured to reduce the rotational speed of the motor 48 for output. For example, at least part of the speed reduction mechanism 66 is configured to rotate about the second axis C2 and overlaps the motor 48 as viewed in the first direction A1 that is orthogonal to the second axis C2.

The first transmission unit 64 includes, for example, a planetary gear mechanism 68. The planetary gear mechanism 68 is, for example, configured to be a speed reducer. The speed reduction mechanism 66 includes, for example, the planetary gear mechanism 68. The planetary gear mechanism 68 is, for example, configured so that the rotational speed of an output rotational body of the planetary gear mechanism 68 connected to the output portion 46 is lower than the rotational speed of an input rotational body of the planetary gear mechanism 68 connected to the rotor 56. At least part of the planetary gear mechanism 68 is, for example, supported by the support 42.

Figure 4:
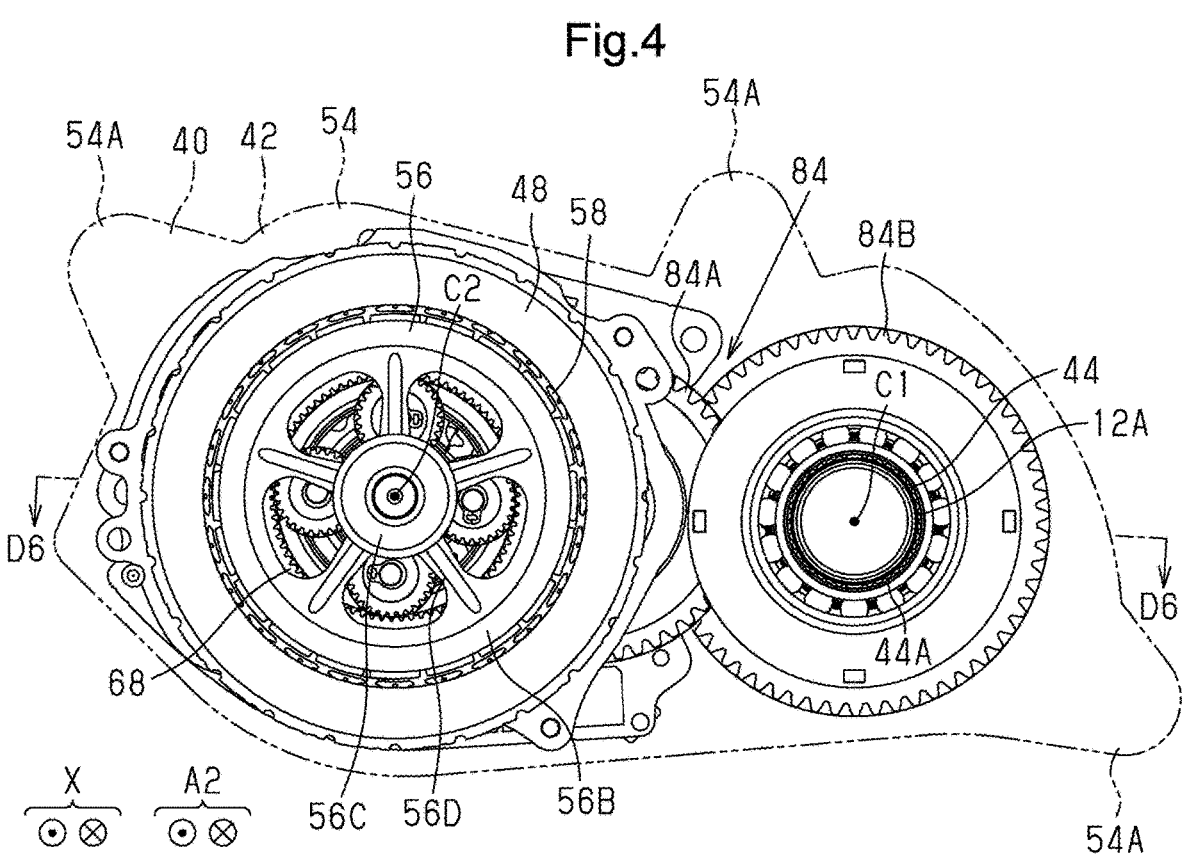
FIG. 4 is a side elevational view of the human-powered vehicle drive unit shown in FIG. 2 without the housing, as viewed from the other side with respect to the axial direction of the drive shaft.
Figure 5:
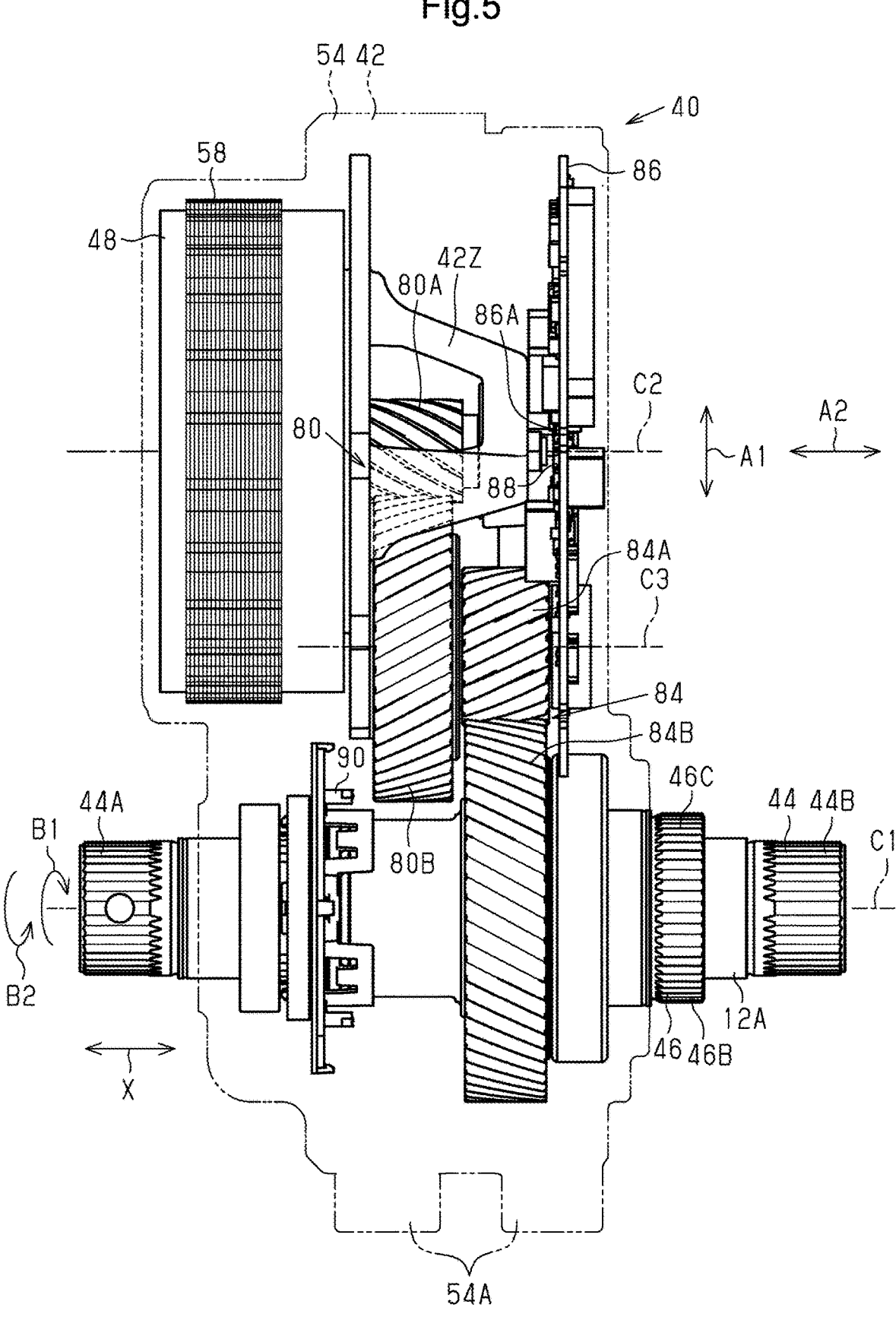
FIG. 5 is a plan view of the human-powered vehicle drive unit shown in FIG. 2 without the housing.

As shown in FIGS. 2, 4, and 7, for example, at least part of the planetary gear mechanism 68 is arranged at a radially inner side of the rotor 56. At least part of the planetary gear mechanism 68 is, for example, arranged at a radially inner side of the outer circumferential portion 56B of the rotor 56. The planetary gear mechanism 68 includes, for example, a portion arranged adjacent to the inner circumferential portion 56C of the rotor 56 and a portion arranged non-adjacent to the inner circumferential portion 56C of the rotor 56 in the second direction A2. At least part of the planetary gear mechanism 68 is, for example, arranged adjacent to the intermediate portion 56D of the rotor 56 in the second direction A2. At least part of the planetary gear mechanism 68 is arranged at a radially outer side of the inner circumferential portion 56C of the rotor 56. The dimension of the planetary gear mechanism 68 arranged at the radially inner side of the outer circumferential portion 56B of the rotor 56 is, for example, greater than the dimension of the planetary gear mechanism 68 arranged at the radially outer side of the inner circumferential portion 56C of the rotor 56 in the second direction A2.

As shown in FIGS. 6 to 8, for example, at least part of the planetary gear mechanism 68 is configured to rotate about the second axis C2 and overlaps the motor 48 as viewed in the first direction A1 that is orthogonal to the second axis C2. At least part of the planetary gear mechanism 68 overlaps, for example, the stator 58 as viewed in the first direction A1. At least part of the planetary gear mechanism 68 is, for example, arranged at a radially inner side of the stator 58.

At least part of the planetary gear mechanism 68 overlaps, for example, the rotor 56 as viewed in the first direction A1. At least part of the planetary gear mechanism 68 overlaps, for example, the outer circumferential portion 56B of the rotor 56 as viewed in the first direction A1. At least part of the planetary gear mechanism 68 overlaps, for example, the inner circumferential portion 56C of the rotor 56 as viewed in the first direction A1. The planetary gear mechanism 68 includes, for example, a portion overlapping the intermediate portion 56D of the rotor 56 and a portion not overlapping the intermediate portion 56D of the rotor 56 as viewed in the first direction A1.

In the present embodiment, part of the planetary gear mechanism 68 overlaps the motor 48 as viewed in the first direction A1. The planetary gear mechanism 68 can entirely overlap the motor 48 as viewed in the first direction A1. In a case where the planetary gear mechanism 68 entirely overlaps the motor 48 as viewed in the first direction A1, for example, the planetary gear mechanism 68 and the rotor 56 are configured so that the planetary gear mechanism 68 is entirely arranged at the radially inner side of the outer circumferential portion 56B of the rotor 56 as viewed in the first direction A1.

The planetary gear mechanism 68 includes, for example, the sun gear 70, a ring gear 72, a planet gear 74, and the carrier 76. The planet gear 74 is provided between the sun gear 70 and the ring gear 72. The carrier 76 supports the planet gear 74.

The sun gear 70 is, for example, provided on the motor output shaft 52. The sun gear 70 receives, for example, rotational torque from the motor output shaft 52. The sun gear 70 can be molded integrally with the motor output shaft 52. Alternatively, the sun gear 70 can be molded separately from the motor output shaft 52 and coupled to the motor output shaft 52 so as to rotate integrally with the motor output shaft 52. In the present embodiment, the sun gear 70 is formed separately from the motor output shaft 52. The sun gear 70 is, for example, coupled to the motor output shaft 52 so as to contact a step provided on the motor output shaft 52. The sun gear 70 is, for example, arranged between the rotor 56 and the second bearing 62 in the second direction A2. The sun gear 70 is, for example, arranged adjacent to the inner circumferential portion 56C of the rotor 56 in the second direction A2. The sun gear 70 meshes with, for example, the planet gear 74. The axis of the sun gear 70 substantially coincides with the second axis C2 of the motor output shaft 52.

The ring gear 72 meshes with, for example, the planet gear 74. The ring gear 72 is, for example, provided on the support 42 in a manner non-rotatable relative to the support 42. The ring gear 72 is, for example, supported by the third support 42Z. The ring gear 72 is, for example, attached to the third support 42Z. The ring gear 72 includes, for example, a flange 72A projecting radially outward. The ring gear 72 includes, for example, a ring gear attachment portion 72B for attachment to the third support 42Z. The ring gear attachment portion 72B is, for example, provided on the flange 72A. The ring gear 72 is, for example, attached to the third support 42Z by a bolt or the like. The ring gear 72 can be formed integrally with the support 42.

In an example, the planet gear 74 receives a rotational torque from the sun gear 70, and is provided between the sun gear 70 and the ring gear 72. The planet gear 74 is, for example, one of a plurality of planet gears 74. The planet gears 74 are, for example, arranged at intervals about the second axis C2 of the motor output shaft 52. The number of planet gears 74 is, for example, two or greater and eight or less. The number of planet gears 74 is, for example, four.

In an example, the carrier 76 supports the planet gear 74, and outputs rotational torque to the output portion 46. The carrier 76 includes, for example, a carrier pin support 76A, a carrier shaft 76B, and a carrier pin 76C. The carrier pin support 76A is molded integrally with the carrier shaft 76B. The rotational axis of the carrier 76 substantially coincides with the second axis C2 of the motor output shaft 52. The carrier shaft 76B is, for example, arranged around the motor output shaft 52.

The carrier pin 76C rotatably supports the planet gear 74 with, for example, a bearing. The carrier pin 76C is, for example, one of a plurality of carrier pins 76C. The carrier pins 76C are, for example, provided on the carrier pin support 76A such that the carrier pins 76C are arranged at intervals about the second axis C2 of the motor output shaft 52. The number of carrier pins 76C corresponds to the number of the planet gears 74.

In an example, at least one of the sun gear 70, the planet gear 74, and the ring gear 72 at least partially overlaps the motor 48 as viewed in the first direction A1. At least part of the sun gear 70 overlaps, for example, the motor 48 as viewed in the first direction A1. At least part of the planet gear 74 overlaps, for example, the motor 48 as viewed in the first direction A1. At least part of the carrier 76 overlaps, for example, the motor 48 as viewed in the first direction A1. At least part of the ring gear 72 overlaps, for example, the motor 48 as viewed in the first direction A1. In a case where at least one of the carrier 76, the sun gear 70, the planet gear 74, and the ring gear 72 at least partially overlaps the motor 48 as viewed in the first direction A1, the remaining ones of the carrier 76, the sun gear 70, the planet gear 74, and the ring gear 72 do not have to overlap the motor 48 as viewed in the first direction A1.

At least one of the carrier 76, the sun gear 70, the planet gear 74, and the ring gear 72 at least partially overlaps, for example, the stator 58 as viewed in the first direction A1. At least one of the carrier 76, the sun gear 70, the planet gear 74, and the ring gear 72 at least partially overlaps, for example, the rotor 56 as viewed in the first direction A1.

As shown in FIGS. 6 to 8, for example, at least part of the sun gear 70 overlaps the stator 58 as viewed in the first direction A1. In the present embodiment, the sun gear 70 entirely overlaps the stator 58 as viewed in the first direction A1. The sun gear 70 can partially overlap the stator 58 as viewed in the first direction A1. At least part of the sun gear 70 is, for example, arranged at the radially inner side of the stator 58.

At least part of the sun gear 70 overlaps, for example, the rotor 56 as viewed in the first direction A1. At least part of the sun gear 70 overlaps, for example, the outer circumferential portion 56B of the rotor 56 as viewed in the first direction A1. In the present embodiment, only part of the sun gear 70 overlaps the outer circumferential portion 56B of the rotor 56 as viewed in the first direction A1. The sun gear 70 can entirely overlap the outer circumferential portion 56B of the rotor 56 as viewed in the first direction A1. The sun gear 70 does not overlap, for example, the inner circumferential portion 56C of the rotor 56 as viewed in the first direction A1. At least part of the sun gear 70 can overlap, for example, the inner circumferential portion 56C of the rotor 56 as viewed in the first direction A1.

At least part of the ring gear 72 overlaps, for example, the stator 58 as viewed in the first direction A1. In the present embodiment, the ring gear 72 entirely overlaps the stator 58 as viewed in the first direction A1. The ring gear 72 can partially overlap the stator 58 as viewed in the first direction A1. At least part of the ring gear 72 is, for example, arranged at the radially inner side of the stator 58.

At least part of the ring gear 72 overlaps, for example, the rotor 56 as viewed in the first direction A1. At least part of the ring gear 72 overlaps, for example, the outer circumferential portion 56B of the rotor 56 as viewed in the first direction A1. In the present embodiment, only part of the ring gear 72 overlaps the outer circumferential portion 56B of the rotor 56 as viewed in the first direction A1. The ring gear 72 can entirely overlap the outer circumferential portion 56B of the rotor 56 as viewed in the first direction A1. At least part of the flange 72A is, for example, provided at a position adjacent to the outer circumferential portion 56B of the rotor 56 in the second direction A2. The ring gear 72 does not overlap, for example, the inner circumferential portion 56C of the rotor 56 as viewed in the first direction A1. At least part of the ring gear 72 can overlap, for example, the inner circumferential portion 56C of the rotor 56 as viewed in the first direction A1.

At least part of the planet gear 74 overlaps, for example, the stator 58 as viewed in the first direction A1. In the present embodiment, the planet gear 74 entirely overlaps the stator 58 as viewed in the first direction A1. The planet gear 74 can partially overlap the stator 58 as viewed in the first direction A1. At least part of the planet gear 74 is, for example, arranged at the radially inner side of the stator 58.

At least part of the planet gear 74 overlaps, for example, the rotor 56 as viewed in the first direction A1. At least part of the planet gear 74 overlaps, for example, the outer circumferential portion 56B of the rotor 56 as viewed in the first direction A1. In the present embodiment, only part of the planet gear 74 overlaps the outer circumferential portion 56B of the rotor 56 as viewed in the first direction A1. The planet gear 74 can entirely overlap the outer circumferential portion 56B of the rotor 56 as viewed in the first direction A1. The planet gear 74 does not overlap, for example, the inner circumferential portion 56C of the rotor 56 as viewed in the first direction A1. At least part of the planet gear 74 can overlap, for example, the inner circumferential portion 56C of the rotor 56 as viewed in the first direction A1.

At least part of the carrier 76 overlaps, for example, the stator 58 as viewed in the first direction A1. In the present embodiment, only part of the carrier 76 overlaps the stator 58 as viewed in the first direction A1. The carrier 76 can entirely overlap the stator 58 as viewed in the first direction A1. At least part of the carrier 76 is, for example, arranged at the radially inner side of the stator 58.

At least part of the carrier 76 overlaps, for example, the rotor 56 as viewed in the first direction A1. At least part of the carrier 76 overlaps, for example, the outer circumferential portion 56B of the rotor 56 as viewed in the first direction A1. In the present embodiment, only part of the carrier 76 overlaps the outer circumferential portion 56B of the rotor 56 as viewed in the first direction A1. The carrier 76 can entirely overlap the outer circumferential portion 56B of the rotor 56 as viewed in the first direction A1. At least part of the carrier 76 overlaps, for example, the inner circumferential portion 56C of the rotor 56 as viewed in the first direction A1. In the present embodiment, only part of the carrier pin 76C of the carrier 76 overlaps the inner circumferential portion 56C of the rotor 56 as viewed in the first direction A1. The carrier 76 does not have to overlap the inner circumferential portion 56C of the rotor 56 as viewed in the first direction A1.

As shown in FIGS. 2 and 7, the planetary gear mechanism 68 has, for example, a maximum outer diameter RX. The maximum outer diameter RX substantially coincides with, for example, the maximum outer diameter of the ring gear 72. The motor 48 has, for example, a minimum inner diameter RY. The minimum inner diameter RY substantially coincides with, for example, the diameter of the inner circumferential surface of the rotor 56. The maximum outer diameter RX of the planetary gear mechanism 68 is, for example, less than the minimum inner diameter RY of the motor 48. For example, the root diameter of the ring gear 72 is less than the diameter of the inner circumferential surface of the outer circumferential portion 56B of the rotor 56. The maximum outer diameter of the ring gear 72 is, for example, greater than the diameter of the inner circumferential surface of the outer circumferential portion 56B of the rotor 56. The maximum outer diameter of the ring gear 72 can be, for example, less than or equal to the diameter of the inner circumferential surface of the outer circumferential portion 56B of the rotor 56. For example, the outer diameter of a part of the ring gear 72 on which a tooth is provided is less than the diameter of the inner circumferential surface of the outer circumferential portion 56B of the rotor 56.

As shown in FIGS. 2 and 6 to 8, for example, the transmission mechanism 50 further includes a transmission shaft 78 having a third axis C3 that differs from the first axis C1 and the second axis C2. The second axis C2 and the third axis C3 are parallel to the first axis C1. The drive shaft 44, the motor output shaft 52, and the transmission shaft 78 are, for example, arranged on the same plane. As viewed in the second direction A2, the first axis C1, the second axis C2, and the third axis C3 are arranged along a single straight line. The transmission shaft 78 is, for example, arranged next to the motor 48 in the first direction A1. For example, the distance from the drive shaft 44 to the motor output shaft 52 is greater than the distance from the drive shaft 44 to the transmission shaft 78.

The transmission shaft 78 is, for example, a hollow shaft. The transmission shaft 78 can be a solid shaft. The transmission shaft 78 is, for example, supported by the second support 42Y and the third support 42Z. The transmission shaft 78 includes, for example, a first transmission shaft end 78A and a second transmission shaft end 78B opposite to the first transmission shaft end 78A in the second direction A2. The first transmission shaft end 78A is, for example, supported by the third support 42Z. For example, a bearing is provided between the first transmission shaft end 78A and the third support 42Z in the first direction A1. The second transmission shaft end 78B is, for example, supported by the second support 42Y. For example, a bearing is provided between the second transmission shaft end 78B and the second support 42Y.

The transmission shaft 78 includes, for example, a first part 78X and a second part 78Y. The first part 78X includes, for example, the first transmission shaft end 78A. The second part 78Y includes, for example, the second transmission shaft end 78B. The first part 78X is, for example, formed integrally with the second part 78Y. For example, the maximum outer diameter of the first part 78X is greater than the maximum outer diameter of the second part 78Y.

The transmission mechanism 50 further includes, for example, a second transmission unit 80. The second transmission unit 80 includes, for example, a first transmission gear 80A and a second transmission gear 80B. The first transmission gear 80A receives torque from the planetary gear mechanism 68. The second transmission gear 80B is engaged with the first transmission gear 80A and is provided on the transmission shaft 78. The first transmission gear 80A is, for example, arranged around the carrier shaft 76B. The axis of the first transmission gear 80A substantially coincides with the second axis C2 of the motor output shaft 52.

The second transmission gear 80B is, for example, arranged around the transmission shaft 78. The axis of the second transmission gear 80B substantially coincides with the third axis C3 of the transmission shaft 78.

The first transmission gear 80A has, for example, a first pitch diameter R1. The second transmission gear 80B has, for example, a second pitch diameter R2. The second pitch diameter R2 is, for example, greater than the first pitch diameter R1. Since the second pitch diameter R2 is greater than the first pitch diameter R1, the rotational speed of the second transmission gear 80B is lower than the rotational speed of the first transmission gear 80A. Each of the first transmission gear 80A and the second transmission gear 80B includes, for example, a helical gear. Each of the first transmission gear 80A and the second transmission gear 80B can include a spur gear.

The drive unit 40 further includes, for example, a third one-way clutch 82. The third one-way clutch 82 is, for example, provided in a power transmission path between the motor 48 and the drive shaft 44. The third one-way clutch 82 is, for example, provided between the second transmission gear 80B and the transmission shaft 78 in the second direction A2. The second transmission gear 80B is, for example, connected to the transmission shaft 78 by the third one-way clutch 82. The third one-way clutch 82 can be provided between the rotor 56 and the motor output shaft 52. The third one-way clutch 82 can be provided at any position of the transmission mechanism 50. The drive unit 40 does not have to include the third one-way clutch 82. In a case where the drive unit 40 does not include the third one-way clutch 82, for example, the motor 48 is configured to be regenerative.

The third one-way clutch 82 is, for example, configured to permit relative rotation of the drive shaft 44 and the second transmission gear 80B in a case where the drive shaft 44 is rotated in the first rotational direction B1 and the motor output shaft 52 is not rotating. The third one-way clutch 82 includes, for example, at least one of a roller clutch, a sprag clutch, and a ratchet clutch.

The transmission mechanism 50 further includes, for example, a third transmission unit 84. The third transmission unit 84 includes, for example, a third transmission gear 84A and a fourth transmission gear 84B. The third transmission gear 84A is, for example, provided on the transmission shaft 78. For example, the distance from the third transmission gear 84A to the second support 42Y is less than the distance from the second transmission gear 80B to the second support 42Y in the second direction A2. The third transmission gear 84A can be connected to the transmission shaft 78 by a one-way clutch. Alternatively, the third transmission gear 84A can be connected to the transmission shaft 78 so as to rotate integrally with the transmission shaft 78. The fourth transmission gear 84B is, for example, engaged with the third transmission gear 84A and is provided on the output portion 46. The fourth transmission gear 84B is, for example, formed on an outer circumferential surface of the output portion 46 at the first output portion end 46A of the output portion 46. The fourth transmission gear 84B can be formed separately from the output portion 46 and coupled to the output portion 46 so as to rotate integrally with the output portion 46.

The third transmission gear 84A has, for example, a third pitch diameter R3. The fourth transmission gear 84B has, for example, a fourth pitch diameter R4. The fourth pitch diameter R4 is, for example, greater than the third pitch diameter R3. Since the fourth pitch diameter R4 is greater than the third pitch diameter R3, the rotational speed of the fourth transmission gear 84B is lower than the rotational speed of the third transmission gear 84A. The third transmission gear 84A and the fourth transmission gear 84B form, for example, helical gears. The third transmission gear 84A and the fourth transmission gear 84B can form spur gears.

As shown in FIGS. 3 to 8, for example, the drive unit 40 further includes a circuit board 86. The electric power of the battery 36 is supplied to, for example, the circuit board 86. The drive unit 40 can include a circuit board that differs from the circuit board 86. The circuit board 86 is, for example, arranged in the accommodation cavity SA. The circuit board 86 is, for example, arranged so that a mounting surface of the circuit board 86 is substantially parallel to the first direction A1. The circuit board 86 is, for example, located at a position separated from the motor output shaft 52 in the second direction A2 that is parallel to the second axis C2. The circuit board 86 is, for example, arranged to face the second motor output shaft end 52B of the motor output shaft 52. The stator 58 includes, for example, coils. The stator 58 includes, for example, connection terminals electrically connected to the coils. For example, the connection terminals extend in the second direction A2 and are electrically connected to the circuit board 86.

The circuit board 86 is, for example, configured to overlap the motor 48 as viewed in the second direction A2. The circuit board 86 is, for example, configured to overlap the planetary gear mechanism 68 as viewed in the second direction A2. The circuit board 86 is, for example, configured to not overlap the drive shaft 44 as viewed in the second direction A2. The circuit board 86 is, for example, configured to not overlap at least part of the transmission mechanism 50 as viewed in the second direction A2. The circuit board 86 is, for example, configured to not overlap the third transmission gear 84A as viewed in the second direction A2. The circuit board 86 is, for example, configured to not overlap the fourth transmission gear 84B as viewed in the second direction A2.

The drive unit 40 further includes, for example, a controller. The controller is, for example, provided on the circuit board 86. The controller includes, for example, a processor that executes predetermined control programs. The processor includes, for example, a central processing unit (CPU) or a micro-processing unit (MPU). The processor can be provided at separate locations. The controller can include one or more microcomputers.

The drive unit 40 further includes, for example, storage. The storage is, for example, provided on the circuit board 86. The storage stores, for example, various control programs and information used for various control processes. In other words, the storage can also be referred to as memory or a computer storage device. The storage is any computer storage device (transitory or non-transitory computer-readable medium) with the sole exception of a transitory propagating signal. The storage includes, for example, non-volatile memory and volatile memory. The non-volatile memory includes, for example, at least one of read-only memory (ROM), erasable programmable read-only memory (EPROM), electrically erasable programmable read-only memory (EEPROM), and flash memory. The volatile memory includes, for example, random-access memory (RAM).

The drive unit 40 further includes, for example, a drive circuit of the motor 48. The drive circuit is, for example, provided on the circuit board 86. The drive circuit includes, for example, an inverter circuit. The drive circuit controls, for example, the electric power supplied from the battery 36 to the motor 48. The drive circuit is, for example, connected to the controller in a manner allowing for wired communication or wireless communication. In a case where the drive circuit is connected to the controller in a manner allowing for wired communication, for example, the drive circuit is configured to communicate with the controller through a conductive body, such as circuit board wiring, an electric wire, or the like. In a case where the drive circuit is connected to the controller in a manner allowing for wired communication, the drive circuit can be configured to communicate with the controller through an optical fiber cable. For example, the drive circuit drives the motor 48 in response to a control signal from the controller.

The drive unit 40 further includes a plurality of detectors. The term "detector" as used herein refers to a hardware device or instrument designed to detect the presence or absence of a particular event, object, substance, or a change in its environment, and to emit a signal in response. The term "detector" as used herein refers to hardware and does not include a human being.

The drive unit 40 further includes, for example, a motor rotational state detector 88 that detects a rotational state of the motor output shaft 52. For example, the motor rotational state detector 88 outputs a signal in accordance with the rotation of the motor output shaft 52. The motor rotational state detector 88 includes, for example, a magnetic sensor. The motor rotational state detector 88 is, for example, configured to detect a magnet provided on the motor output shaft 52. The magnet is, for example, provided on the second motor output shaft end 52B of the motor output shaft 52. The circuit board 86 includes, for example, a predetermined part 86A facing the motor output shaft 52 in the second direction A2. The motor rotational state detector 88 is, for example, provided on the predetermined part 86A. The motor rotational state detector 88 is, for example, connected to the controller by a conductive line, an electric cable, a wireless communication device, or the like. The motor rotational state detector 88 and the controller are, for example, provided on the same circuit board 86.

The drive unit 40 further includes, for example, a human driving force detector 90 that is configured to detect a human driving force applied to the human-powered vehicle 10. The human driving force detector 90 includes, for example, a strain sensor. The strain sensor includes a strain gauge. The human driving force detector 90 can include a magnetostrictive sensor. The human driving force detector 90 is, for example, provided on an outer circumferential surface of the drive shaft 44 or in the vicinity of the outer circumferential surface of the drive shaft 44. The human driving force detector 90 is, for example, provided on a circuit board that differs from the circuit board 86 on which the controller is provided. The human driving force detector 90 is, for example, connected to the controller by a conductive line, an electric cable, a wireless communication device, or the like. The human driving force detector 90 can be provided on one or both of the crank arms 12B and 12C. In a case where the human driving force detector 90 is provided on one or both of the crank arms 12B and 12C, for example, the human driving force detector 90 includes a strain sensor.

The controller is, for example, configured to calculate the rotational speed of the motor 48 based on a signal from the motor rotational state detector 88. The controller is, for example, configured to control the motor 48 based on a signal from the motor rotational state detector 88. The controller is, for example, configured to control the motor 48 based on a signal from the human driving force detector 90. The controller is, for example, configured to change the assist force produced by the motor 48 based on a signal from the human driving force detector 90.

The transmission mechanism 50 shown in FIGS. 6 to 8 reduces the rotational speed of the motor 48 with the first transmission unit 64, the second transmission unit 80, and the third transmission unit 84, and transmits the motor torque to the output portion 46. The transmission mechanism 50 reduces the rotational speed of the motor 48 with the plurality of transmission units, and transmits the motor torque to the output portion 46. Accordingly, the transmission mechanism 50 applies propulsion force to the human-powered vehicle 10 in a preferred manner. The planetary gear mechanism 68 and the drive shaft 44 are arranged about different axes. Therefore, compared to a case where the planetary gear mechanism 68 is provided on the drive shaft 44, the drive unit 40 brings the crank axle 12A closer to the wheel axle of the rear wheel. The planetary gear mechanism 68 overlaps the motor 48 as viewed in the first direction A1. This reduces the drive unit 40 in size in the second direction A2.

MODIFICATIONS

The description related with the above embodiment exemplifies, without any intention to limit, an applicable form of a drive unit for a human-powered vehicle in accordance with the present disclosure. The drive unit for a human-powered vehicle according to the present disclosure is applicable to, for example, modifications of the above embodiment that are described below and combinations of at least two of the modifications that do not contradict each other. In the modifications described hereafter, the same reference numerals are given to those components that are the same as the corresponding components of the above embodiment. Such components will not be described in detail.

Figure 9:
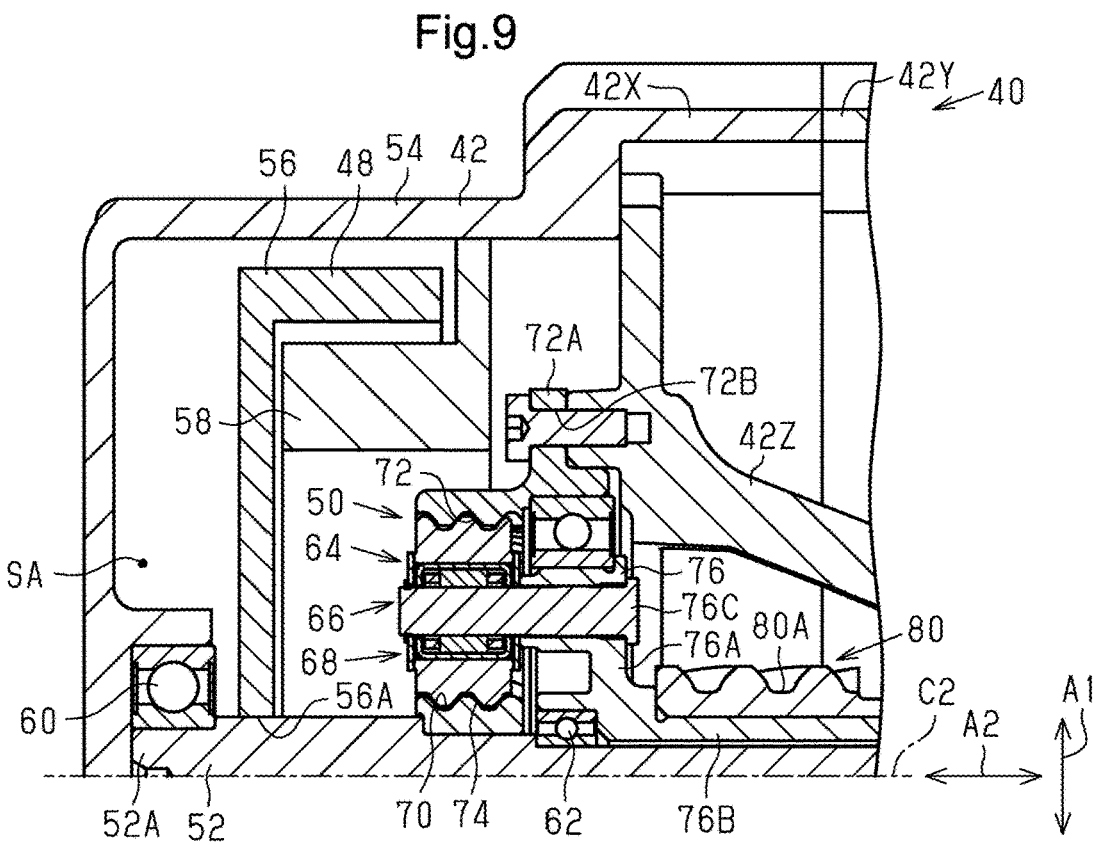
FIG. 9 is an enlarged cross-sectional view of a portion of a human-powered vehicle drive unit of a first modification.

As shown in FIG. 9, the motor 48 can be an outer rotor type motor. The rotor 56 shown in FIG. 9 is, for example, arranged at a radially outer side of the stator 58. At least part of the planetary gear mechanism 68 is, for example, arranged at a radially inner side of the stator 58. At least part of the planetary gear mechanism 68 overlaps, for example, the stator 58 as viewed in the first direction A1.

Figure 10:
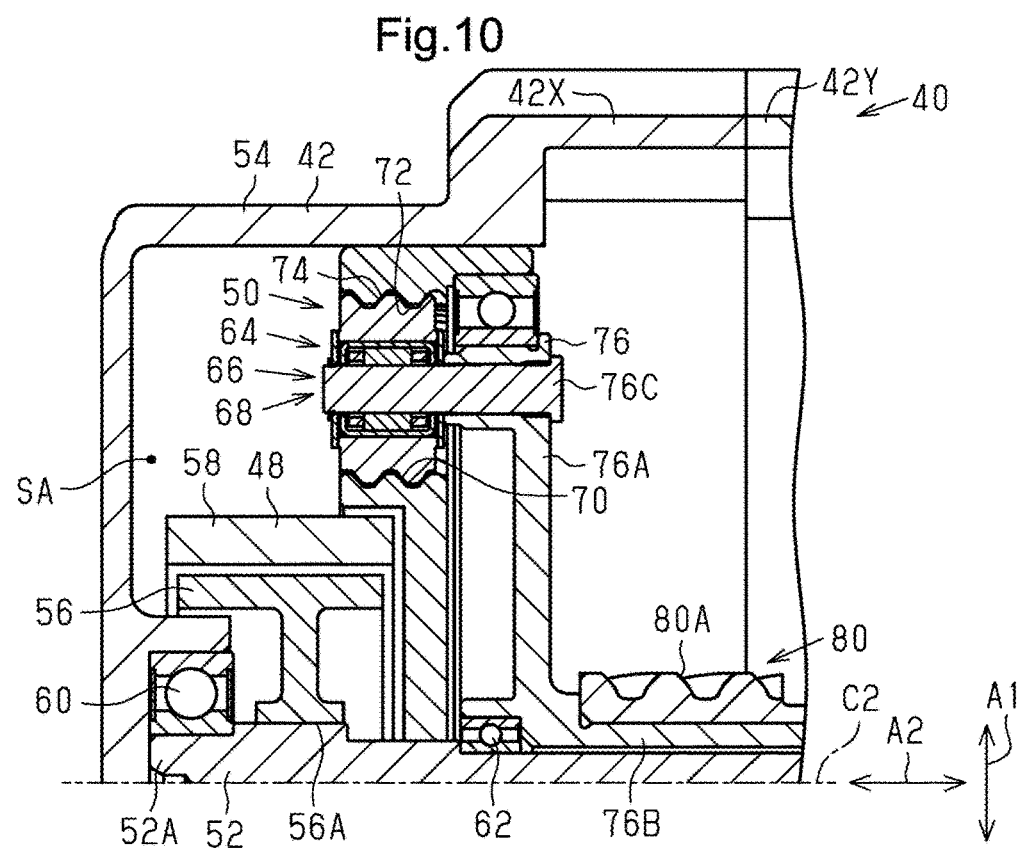
FIG. 10 is an enlarged cross-sectional view of a portion of a human-powered vehicle drive unit of a second modification.

As shown in FIG. 10, at least part of the planetary gear mechanism 68 can overlap the rotor 56 at a radially outer side of the motor 48 as viewed in the first direction A1. In this modification, the motor 48 can be an inner rotor type motor or an outer rotor type motor.

The transmission mechanism 50 can include a speed increaser. In this modification, for example, at least one of the second transmission unit 80 and the third transmission unit 84 is configured to be a speed increaser. The transmission mechanism 50 can include, for example, another speed increaser in addition to the at least one of the second transmission unit 80 and the third transmission unit 84. In this modification, for example, the transmission mechanism 50 can be configured to combine the speed reduction mechanism 66 and the speed increasers to reduce the rotational speed of the motor 48, and transmit the motor torque to the output portion 46.

Instead of the planetary gear mechanism 68, the speed reduction mechanism 66 can include a first outer circumferential gear provided on the outer circumferential portion 56B of the rotor 56, and a second outer circumferential gear meshed with the first outer circumferential gear and having a greater pitch diameter than the first outer circumferential gear. The second outer circumferential gear is, for example, provided on the transmission shaft 78. In this modification, for example, the first outer circumferential gear is configured to at least partially overlap the motor 48 as viewed in the first direction A1.

The planetary gear mechanism 68 can be configured so that the rotational torque input to the sun gear 70 is output from the ring gear 72. In this modification, for example, the ring gear 72 is configured to output the rotational torque to the drive shaft 44. In this modification, for example, the carrier 76 is configured to be non-rotatable relative to the sun gear 70.

The planetary gear mechanism 68 can be a speed increaser. In this modification, for example, the transmission mechanism 50 can be configured to combine the planetary gear mechanism 68, which is configured to be a speed increaser, and the second transmission unit 80 and the third transmission unit 84, which are configured to be speed reducers, to reduce the rotational speed of the motor 48, and transmit the motor torque to the output portion 46.

At least one of the second transmission unit 80 and the third transmission unit 84 can be omitted. In addition to the first transmission unit 64, the second transmission unit 80, and the third transmission unit 84, the transmission mechanism 50 can further include a transmission unit that differs from the first transmission unit 64, the second transmission unit 80, and the third transmission unit 84.

At least one of the second transmission unit 80 and the third transmission unit 84 can include a chain and sprockets, instead of the gears. At least one of the second transmission unit 80 and the third transmission unit 84 can include pulleys and a belt.

The transmission mechanism 50 can further include an additional transmission shaft in addition to the transmission shaft 78. In a case where the transmission mechanism 50 includes an additional transmission shaft, for example, the transmission mechanism 50 includes a fourth transmission unit provided on the additional transmission shaft, in addition to the planetary gear mechanism 68, the second transmission unit 80, and the third transmission unit 84.

At least one of the second axis C2 and the third axis C3 can be non-parallel to the first axis C1. In this modification, for example, the second axis C2 and the third axis C3 can be orthogonal to the first axis C1. In this modification, for example, the motor 48 can be configured so that the second axis C2 and the third axis C3 are orthogonal to the axial direction X of the drive shaft 44 and the first axis C1.

At least part of the first bearing 60 can be arranged so as to not overlap the rotor 56 as viewed in the first direction A1.

The circuit board 86 can be arranged so as the circuit board 86 does not overlap the motor output shaft 52 in the second direction A2.

The circuit board 86 can be arranged to overlap the transmission shaft 78 in the second direction A2.

The first maximum outer diameter RA can be less than or equal to the second maximum outer diameter RB.

The motor rotational state detector 88 can be provided at a position that differs from the predetermined part 86A. In this modification, for example, the motor rotational state detector 88 is provided at a radially outer side of the motor 48. The position of the motor rotational state detector 88 in the drive unit 40 can be changed as long as the motor rotational state detector 88 is provided at a part that allows for detection of the rotational state of the motor 48.

The drive unit 40 does not have to include the human driving force detector 90. In a case where the drive unit 40 does not include the human driving force detector 90, a detector that detects a human driving force can be provided on the crank arms 12B and 12C or the pedals 20A and 20B.

In this specification, the phrase "at least one of" as used in this disclosure means "one or more" of a desired choice. As one example, the phrase "at least one of" as used in this disclosure means "only one single choice" or "both of two choices" if the number of its choices is two. As another example, the phrase "at least one of" as used in this disclosure means "only one single choice" or "any combination of two or more choices" if the number of its choices is three or more. Also, the term "and/or" as used in this disclosure means "either one of or both of." For instance, the phrase "at least one of A and B" encompasses (1) A alone, (2) B alone, and (3) both A and B. The phrase "at least one of A, B, and C" encompasses (1) A alone, (2) B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Ordinal numerals such as "first", "second", and "third" are used in this disclosure only to distinguish members having the same name from one another and are not intended to have any special meaning.

What is claimed is:

1. A drive unit for a human-powered vehicle, the drive unit comprising:
   a support;
   a drive shaft configured to receive a human driving force, and having a first axis;
   an output portion provided on the drive shaft;
   a motor including a rotor and a stator;
   a transmission mechanism configured to transmit a motor torque of the motor to the output portion; and
   a motor output shaft connected to the rotor, and having a second axis differing from the first axis,
   the transmission mechanism including a first transmission unit that includes a planetary gear mechanism,
   at least part of the planetary gear mechanism being configured to rotate about the second axis and overlapping the motor as viewed in a first direction that is orthogonal to the second axis, and
   the at least part of the planetary gear mechanism overlaps the rotor at a radially outer side of the motor as viewed in the first direction.

2. The drive unit according to claim 1, wherein the at least part of the planetary gear mechanism overlaps the rotor as viewed in the first direction.

3. The drive unit according to claim 1, wherein the stator is arranged at a radially outer side of the rotor, and
   the at least part of the planetary gear mechanism is arranged at a radially inner side of the rotor.

4. The drive unit according to claim 1, wherein the rotor is arranged at a radially outer side of the stator, and
   the at least part of the planetary gear mechanism is arranged at a radially inner side of the stator.

5. The drive unit according to claim 1, wherein the at least part of the planetary gear mechanism overlaps the rotor at a radially outer side of the motor as viewed in the first direction.

6. The drive unit according to claim 1, wherein the transmission mechanism further includes a transmission shaft having a third axis that differs from the first axis and the second axis.

7. The drive unit according to claim 6, wherein the transmission mechanism further includes a second transmission unit including a first transmission gear that receives torque from the planetary gear mechanism, and a second transmission gear that is engaged with the first transmission gear and is provided on the transmission shaft.

8. The drive unit according to claim 7, wherein the first transmission gear has a first pitch diameter, the second transmission gear has a second pitch diameter, and
   the second pitch diameter is greater than the first pitch diameter.

9. The drive unit according to claim 7, wherein the transmission mechanism further includes a third transmission unit including a third transmission gear that is provided on the transmission shaft, and a fourth transmission gear that is engaged with the third transmission gear and is provided on the output portion.

10. The drive unit according to claim 9, wherein the third transmission gear has a third pitch diameter, the fourth transmission gear has a fourth pitch diameter, and
    the fourth pitch diameter is greater than the third pitch diameter.

11. The drive unit according to claim 6, wherein the second axis and the third axis are parallel to the first axis.

12. The drive unit according to claim 1, wherein the planetary gear mechanism includes
    a sun gear configured to receive a rotational torque from the motor output shaft,
    a ring gear non-rotatably provided on the support,
    a planet gear configured to receive a rotational torque from the sun gear and is provided between the sun gear and the ring gear, and
    a carrier supporting the planet gear and configured to output a rotational torque to the output portion.

13. A drive unit for a human-powered vehicle, the drive unit comprising:
    a support;
    a drive shaft configured to receive a human driving force and having a first axis;
    an output portion provided on the drive shaft;
    a motor including a rotor and a stator;

a transmission mechanism configured to transmit a motor torque of the motor to the output portion; and a motor output shaft connected to the rotor, and having a second axis differing from the first axis, the transmission mechanism including a first transmission unit that includes a planetary gear mechanism, at least part of the planetary gear mechanism being configured to rotate about the second axis and overlapping the motor as viewed in a first direction that is orthogonal to the second axis, and the planetary gear mechanism entirely overlaps the motor as viewed in the first direction.

14. The drive unit according to claim 1, wherein:

the planetary gear mechanism includes a sun gear, a ring gear, a planet gear provided between the sun gear and the ring gear, and a carrier supporting the planet gear; and at least one of the sun gear, the planet gear, and the ring gear at least partially overlaps the motor as viewed in the first direction.

15. The drive unit according to claim 14, wherein at least part of the ring gear overlaps the motor as viewed in the first direction.

16. The drive unit according to claim 1, further comprising:

a first bearing rotatably supporting the motor output shaft, and at least part of the first bearing overlapping the rotor as viewed in the first direction.

17. The drive unit according to claim 1, wherein the motor has a first maximum outer diameter, the output portion has a second maximum outer diameter, and the first maximum diameter is greater than the second maximum diameter.

18. The drive unit according to claim 1, further comprising:

a circuit board, and the circuit board being arranged at a position separated from the motor output shaft in a second direction that is parallel to the second axis.

19. A drive unit for a human-powered vehicle, the drive unit comprising:

a support;

a drive shaft configured to receive a human driving force, and having a first axis;

an output portion provided on the drive shaft;

a motor including a rotor and a stator;

a transmission mechanism configured to transmit a motor torque of the motor to the output portion;

a motor output shaft connected to the rotor, and having a second axis differing from the first axis;

a circuit board; and a motor rotational state detector configured to detect a rotational state of the motor output shaft, the transmission mechanism including a first transmission unit that includes a planetary gear mechanism, at least part of the planetary gear mechanism being configured to rotate about the second axis and overlapping the motor as viewed in a first direction that is orthogonal to the second axis, the circuit board being arranged at a position separated from the motor output shaft in a second direction that is parallel to the second axis, the circuit board including a predetermined part facing the motor output shaft in the second direction, and the motor rotational state detector being provided on the predetermined part.

20. The drive unit according to claim 1, further comprising a human driving force detector configured to detect a human driving force applied to the human-powered vehicle.

21. A drive unit for a human-powered vehicle, the drive unit comprising:

a support;

a drive shaft configured to receive a human driving force, and having a first axis;

an output portion provided on the drive shaft;

a motor including a rotor and a stator;

a transmission mechanism configured to transmit a motor torque of the motor to the output portion; and a motor output shaft connected to the rotor, and having a second axis differing from the first axis, the transmission mechanism including a first transmission unit that includes a speed reduction mechanism, and at least part of the speed reduction mechanism being configured to rotate about the second axis and overlapping the motor as viewed in a first direction that is orthogonal to the second axis, and the at least part of the speed reduction mechanism overlaps the rotor at a radially outer side of the motor as viewed in the first direction.

* * * * *